(12) United States Patent
Yano

(10) Patent No.: US 7,409,083 B2
(45) Date of Patent: Aug. 5, 2008

(54) IMAGE PROCESSING METHOD AND APPARATUS

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 736 days.

(21) Appl. No.: 10/890,148

(22) Filed: Jul. 14, 2004

(65) Prior Publication Data

US 2005/0013506 A1 Jan. 20, 2005

(30) Foreign Application Priority Data

Jul. 18, 2003 (JP) ............................. 2003-199121
Jul. 18, 2003 (JP) ............................. 2003-199123

(51) Int. Cl.
*G06K 9/00* (2006.01)

(52) U.S. Cl. ...................................... 382/166; 382/162

(58) Field of Classification Search ................. 382/162, 382/166–167, 232, 274; 358/500, 501, 510
See application file for complete search history.

(56) References Cited

U.S. PATENT DOCUMENTS

| 6,507,358 | B1 | 1/2003 | Mori et al. ..................... 348/42 |
| 6,628,825 | B1 | 9/2003 | Yamazoe et al. ............ 382/167 |
| 2003/0067620 | A1 | 4/2003 | Masumoto et al. ......... 358/1.13 |
| 2003/0067638 | A1 | 4/2003 | Yano .......................... 358/540 |
| 2003/0156196 | A1 | 8/2003 | Kato et al. ............... 348/207.2 |
| 2004/0046990 | A1 | 3/2004 | Yano et al. .................. 358/1.15 |

OTHER PUBLICATIONS

Durand, et al., "Fast Bilateral Filtering for the Display of High-Dynamic-Range Images," ACM Transactions on Graphics, vol. 21, No. 3 (Jul. 2002).
Daniel J. Jobson, et al. "A Multiscale Retinex for Bridging the Gap Between Color Images and the Human Observation of Scenes," vol. 6, No. 7, pp. 965-976 (1997).
Erik Reinhard, et al. "Photographic Tone Reproduction for Digital Images," vol. 21, No. 7, (2002).
Durand et al., "Fast Bilateral Filtering for the Display of High-Dynamic-Range Images," ACM Transactions on Graphics, vol. 21, No. 3 (Jul. 2002).

*Primary Examiner*—Duy M Dang
(74) *Attorney, Agent, or Firm*—Fitzpatrick, Cella, Harper & Scinto

(57) ABSTRACT

It aims to prevent occurrence of gradation jump or color displacement even if a process for improving a brightness distribution of a digital image to be processed is performed. An image processing method for achieving such prevention comprises: an extraction step of extracting a brightness component from image data; a scale conversion step of obtaining a distribution of the brightness component on relatively large scale; an improvement step of improving the brightness component distribution of the image data by using the brightness component and an output in the scale conversion step; and a gradation compression step of judging whether or not the image data reconstituted according to the improved brightness component distribution is within a predetermined color gamut, and, when it is judged that the reconstituted image data includes the image data outside the predetermined color gamut, of performing a gradation compression process.

18 Claims, 7 Drawing Sheets

IMAGE PROCESSING METHOD AND APPARATUS

This application claims priorities from Japanese Patent Applications No. 2003-199121 and No. 2003-199123 both filed on Jul. 18, 2003, which are hereby incorporated by reference.

BACKGROUND OF THE INVENTION

1. Field of the Invention

The present invention relates to image processing method and apparatus which improve a distribution of brightness of a digital image.

2. Related Background Art

Conventionally, as a method of taking a photograph of appropriate brightness, a method of measuring average luminance of a scene to be taken or photographed and then controlling shutter speed, a aperture value and the like based on the measured average luminance is known. Moreover, an exposure control method based on so-called evaluation photometry that a scene is first divided into predetermined areas, luminance of each of the divided areas is measured, the measured luminance is appropriately weighted with respect to each area, average luminance is then obtained based on the weighted values, and appropriate exposure is thus obtained with respect to the entire scene is known.

Incidentally, in a scene taken against light (also called a backlight scene) that the brightness of a main subject is remarkably dark as compared with that of its background, the main subject portion on a taken or photographed image is inevitably dark. Therefore, to take a photograph in which appropriate brightness can be secured even in case of a backlight scene, it is necessary at the moment of taking the photograph to preset exposure of a camera so that the subject is taken brightly as compared with a case of taking an average photograph. However, such an exposure correction operation is troublesome for a user, and moreover skill is required to appropriately set the exposure of the camera. Besides, even if the exposure correction is appropriately performed with respect to the main subject, the background portion of the main subject adversely tends to become bright excessively.

In order to solve such a problem, it is necessary to obtain an image of appropriate brightness even in the backlight scene or the like that it is generally difficult to appropriately determine the brightness of the image.

Thus, to achieve this, in analog photographing technique, print of appropriate brightness can be obtained by performing so-called a dodging process in a darkroom. Therefore, it is desirable even in a digital image process to easily achieve a dodging process similar to that in the analog photographing technique.

For example, a method of achieving the dodging process is proposed by Daniel J. Jobson et al. in "A Multiscale Retinex for Bridging the Gap Between Color Images and the Human Observation of Scenes", IEEE TRANSACTIONS ON IMAGE PROCESSING, VOL. 6, NO. 7, July 1997 (hereinafter called a prior art 1). In this method, a difference process between a component obtained by logarithmic transforming a digital image and a low-frequency component of the logarithmic-transformed component is performed to darken a bright component and brighten a dark component in a low-frequency area in the digital image, thereby achieving image improvement.

Besides, another method of achieving the dodging process in the digital image process is proposed by Reinhard et al. in "Photographic Tone Reproduction for Digital Images", acm Transactions on Graphics, July 2002, Vol. 21, No. 3 (hereinafter called a prior art 2), in which a dodging-like effect is obtained in the digital image process by using a luminance component of a digital image and a low-frequency component thereof.

However, in the above conventional methods, there is a problem that, in a case where the image data in which the improvement process has been performed to the brightness of the digital image to be processed cannot be fell within the range of a predetermined color space, a gradation jump and a color tone displacement (aberration) occur with respect to the color of the image data outside the color space because it is replaced with the color on the border area of the color space and the replaced color is then output.

Moreover, in the above conventional methods, there is a problem that, in the image data in which the improvement process has been performed to the brightness of the digital image to be processed, a contrast in the low-frequency area of the image deteriorates because a black level and a white level in the low-frequency area change, whereby the image becomes vague as a whole.

SUMMARY OF THE INVENTION

An object of the present invention is to solve the above conventional problems, and moreover to prevent occurrence of gradation jump or color displacement even if a process for improving a brightness distribution of a digital image to be processed is performed.

In order to achieve the above object, according to the present invention as recited in claim 1, it is characterized by comprising: an extraction step of extracting a brightness component from image data; a scale conversion step of obtaining a distribution of the brightness component on relatively large scale; an improvement step of improving the brightness component distribution of the image data by using the brightness component and an output in the scale conversion step; and a gradation compression step of judging whether or not the image data reconstituted according to the improved brightness component distribution is within a predetermined color gamut, and, when it is judged that the reconstituted image data includes the image data outside the predetermined color gamut, of performing a gradation compression process.

Another object of the present invention is to prevent lowering of contrast in a low-frequency area of an image due to a process for improving a brightness distribution of a digital image to be processed.

In order to achieve the above object, according to the present invention as recited in claim 10, it is characterized by comprising: an extraction step of extracting a brightness component from image data; a low-frequency component calculation step of obtaining a low-frequency component of the brightness component; a correction step of correcting the brightness component by using the low-frequency component of the brightness component calculated in the low-frequency component calculation step; and an adjustment step of adjusting the brightness component corrected in the correction step, by using an adjustment condition obtained from a feature amount of the brightness component in an image before execution of the correction step and a feature amount of the brightness component in the image after execution of the correction step.

Other object and features of the present invention will be apparent from the following description in conjunction with the accompanying drawings.

DESCRIPTION OF THE PREFERRED EMBODIMENTS

Figure 1:
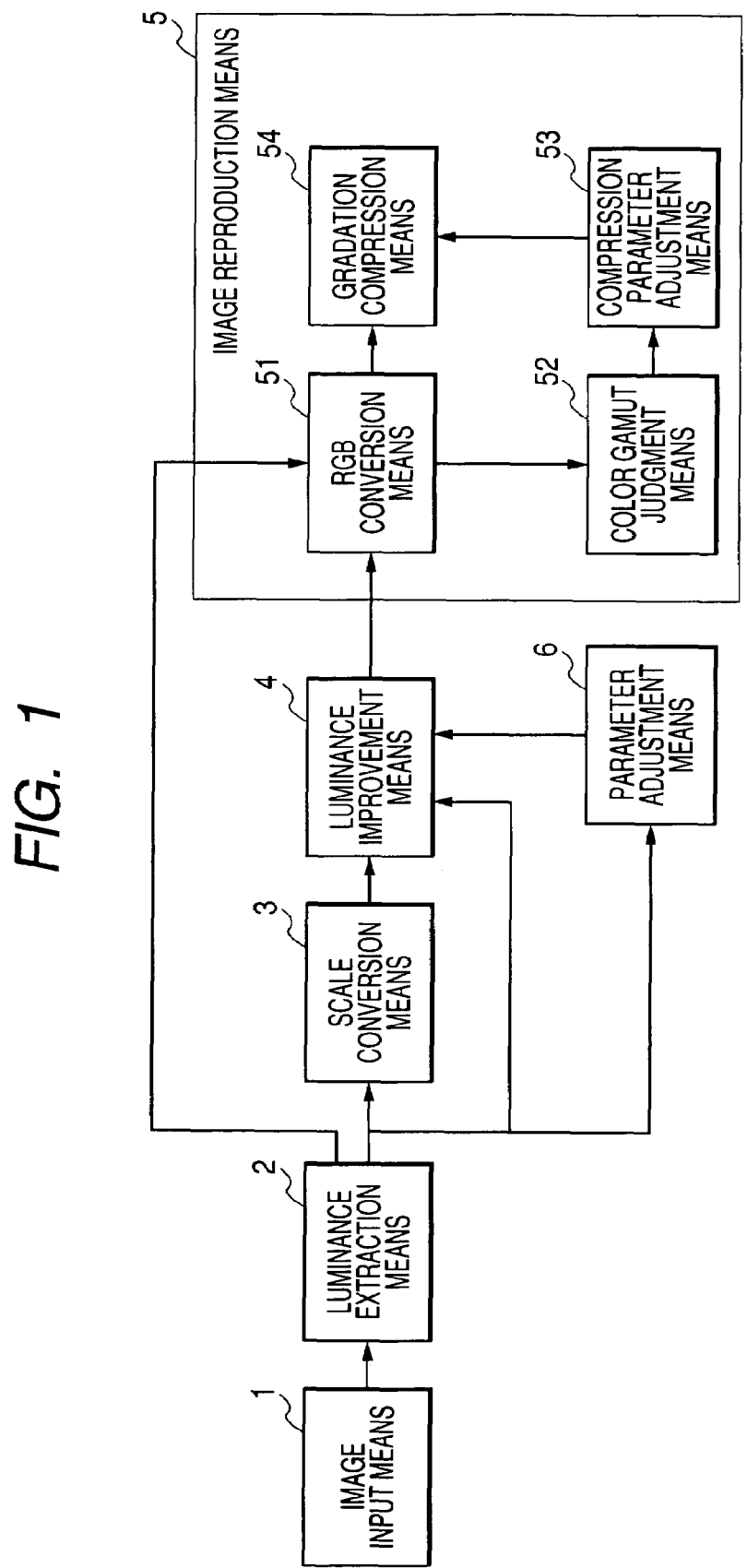
FIG. 1 is a view showing the structure of an image processing system according to the first embodiment.

Hereinafter, the embodiments will be explained with reference to the accompanying drawings. Here, it should be noted that, throughout the drawings, the same structures are respectively denoted by the same reference numerals.

First Embodiment

FIG. 1 shows the structure of an image processing system according to the present embodiment.

In FIG. 1, reference numeral 1 denotes an image input means for inputting digital image data (hereinafter, called image data) into the image processing system. For example, such the input means is constituted in a digital camera, a scanner or the like.

Reference numeral 2 denotes a luminance extraction means for extracting luminance components and color components from the image data which was input by the image input means 1. Reference numeral 3 denotes a scale conversion means for obtaining the distribution, on a relative large scale, of the luminance component of the image data which was output from the luminance extraction means 2. Reference numeral 4 denotes a luminance improvement means for improving the distribution of the luminance component of the image data by use of the luminance component of the image data which was output from the luminance extraction means 2 and the distribution, on the relative large scale, of the luminance component which was output from the scale conversion means 3.

Reference numeral 5 denotes an image reproduction means for reconstituting the image data by synthesizing the improved luminance component which was output from the luminance improvement means 4 with the color component which was output from the luminance extraction means 2. The image reproduction means 5 is composed of an RGB conversion means 51, a color gamut judgment means 52, a compression parameter adjustment means 53 and a gradation compression means 54. The RGB conversion means 51 synthesizes the improved luminance component with the color component and converts the synthesized data into R (red), G (green) and B (blue) image data. The color gamut judgment means 52 judges whether or not the converted RGB image data can be included in a predetermined color space. The compression parameter adjustment means 53 obtains a compression parameter in case of compressing the gradation in accordance with a color gamut of the RGB image data in a case where the RGB image data cannot be included in the predetermined color space. The gradation compression means 54 compresses the gradation for the RGB image data by using the compression parameter and encodes the data as image data in the predetermined color space.

Reference numeral 6 denotes a parameter adjustment means for adjusting parameters so as to maintain a degree of improvement to be processed in the luminance improvement means 4 in the optimum condition from the luminance component of the image data which was output from the luminance extraction means 2 in accordance with the image data.

An operation of the above-structured image processing system can be also performed by an application program on a general-purpose computer. Hereinafter, in the present specifications, the image processing system of which the operation is mainly performed in the application program will be explained, and the constitution in the image processing system shown in FIG. 1 will be complementarily explained.

Figure 2:
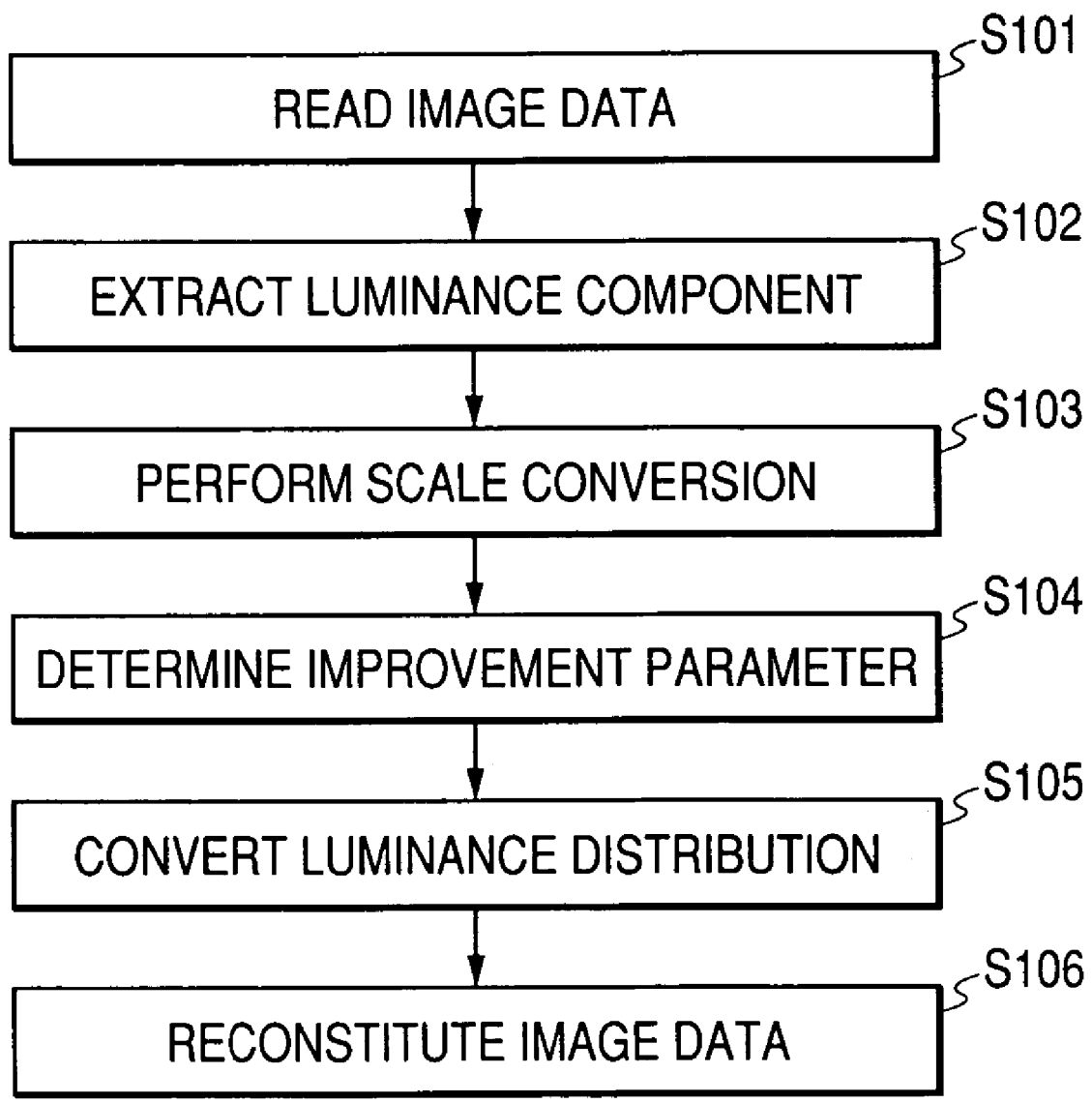
FIG. 2 is a view showing algorithm of an application program in the image processing system according to the first embodiment.

FIG. 2 shows algorithm of the application program by which the operation of the image processing system in the present embodiment is performed on the general-purpose computer.

First, when the application program is activated, a user inputs a file name of the image data, and the image data is read to be stored in a storage unit in the computer (step S101).

The image data which was read corresponds to a two-dimensional arrangement of M×N pixels (here, symbol M denotes the number of horizontal pixels and symbol N denotes the number of vertical pixels) composed of, for example, eight-bit pixels, and the image data is composed of three planes of R, G and B components. The image data is assumed to be expressed by the R, G and B components as R(x, y), G(x, y) and B(x, y) (here, (x, y) are integers of representing a pixel position to be maintained within ranges of $1 \leq x \leq M$, $1 \leq y \leq N$). In a case where the image data is compressed by a method such as a JPEG (Joint Photographic Experts Group) method or the like, the image data is expanded in accordance with a predetermined expansion method so as to obtain image data composed of pixels of the R, G and B data.

Next, the luminance component is extracted on the basis of pixels of the R, G and B components composing the image data (step S102).

With respect to extraction of the luminance component, for example, it is assumed that the pixel components of R, G and B correspond to data in an sRGB color space described in the IEC (International Electro-technical Commission) 61966-2-1, and the data is converted into data of CIE (Commission Internationale de l'Eclairage, International Commission on Illumination) 1931XYZ by a gamma conversion and a 3×3 matrix operation in accordance with a method described in the IEC 61966-2-1. Here, when the converted X, Y and Z data are assumed to be respectively represented as X(x, y), Y(x, y) and Z(x, y), data of Y(x, y) corresponds to the luminance component to be extracted. When the luminance extraction is organized by the hardware, for example, it can be organized by a table reference circuit (section of gamma conversion) according to a look-up table and a matrix operation circuit.

As a method of extracting the luminance component, the above process is simplified, and the luminance component may be extracted by only the matrix operation. Further, conversion from the RGB data into YCbCr data, the RGB data into L*a*b* data or the RGB data into HSV data may be used.

Next, the distribution of the luminance component on the relative large scale is obtained from the extracted luminance component (step S103).

In order to obtain the distribution of the luminance component on the large scale, for example, a convolution operation with the extracted luminance component and a Gaussian function is performed as in the prior art 1 to supply an output (however, in the prior art 1, the convolution operation is directly performed to pixels of R, G and B components of the image data but is not performed to the luminance component of the image data). In order to raise image quality of the improved image data, it is preferable that the convolution operation with the plural Gaussian functions different in the standard deviation is performed to obtain the distribution of the luminance component on plural scales. It should be noted that the above process of obtaining the distribution of the luminance component on the large scale is called a scale conversion hereinafter. In case of organizing the scale conversion by the hardware, for example, it can be organized by a convolution operation circuit.

A method of obtaining the luminance component on the large scale corresponds to a method of obtaining a low frequency component of the luminance component. A method of obtaining the luminance component on plural scales corresponds to a method of obtaining frequency components of the different luminance components. The luminance component on the large scale may be an average value of plural pixels containing a target pixel.

Next, a parameter, which determines a degree of the luminance distribution to be improved from the extracted luminance component, is adjusted (step S104). Since adjustment of the parameter associates with a process of improving the luminance distribution, the details thereof will be described later.

Next, the distribution of the luminance component of the image data is improved by using the luminance component of the image data and the distribution of the luminance component to which the scale conversion was performed (step S105).

For example, according to a method based on the prior art 1, a logarithmic transformation is performed to the luminance component and the distribution of the luminance component to which the scale conversion was performed, and the obtained difference between them is output. Further, a weighted average of a difference output on different scales is assumed as the improved luminance component. However, since the degree of improvement cannot be adjusted in accordance with an image by this method, a logarithmic transformation output of the luminance component, to which the scale conversion was performed, is multiplied by a coefficient. This coefficient corresponds to a parameter of adjusting the degree of improvement. An output of the improved luminance component on the basis of the above process is indicated by the following equation (1).

$$Y'(x, y) = \sum_n w_n \{\log Y(x, y) - \gamma \cdot \log[F_n(x, y) * Y(x, y)]\} \quad (1)$$

Here, Y' (x, y), $F_n$(x, y), $w_n$, n and γ respectively denote an output of the improved luminance component, a Gaussian function, weight between scales, a parameter for representing the scale and a parameter for representing the degree of improvement. Further, symbol "*" denotes the convolution operation.

It is understood that the weight between scales can be omitted by adjusting a standard deviation of the scale (replaced to a simple average) and it is preferable to return a luminance unit to an original luminance unit by an inverse transformation (exp. operation) rather than a value of logarithmic transformed is output as in the equation (1) as image quality of the improved image data. Therefore, it is preferable that an output indicated by the following equation (2) corresponds to the improved luminance component.

$$Y'(x,y)=\exp<\log Y(x,y)-\gamma \cdot \text{Avg}\{\log[F_n(x,y)*Y(x,y)]\}> \quad (2)$$

where the Avg indicates an average value operation.

The following equation (3) may be available instead of the equation (2).

$$Y'(x, y) = \frac{Y(x, y)}{[\text{Avg}\{F_n(x, y) * Y(x, y)\}]^\gamma} \quad (3)$$

It should be noted that the average value operation of a scale conversion output on the plural scales is performed by the scale conversion process in the step S103, and an average value of the scale conversion output on the plural scales may be treated as the distribution of the luminance component to which the scale conversion was performed.

In case of organizing this luminance conversion by the hardware, for example, it can be organized by an average value operation circuit, a circuit for forming the look-up table, a table storage unit, the table reference circuit (section of gamma conversion) and a division circuit. The average value operation circuit may be provided in the scale conversion means.

Here, an example of a parameter adjustment method in the step S104 will be explained as to a case of converting the luminance by the equation (3) in the step S105.

Initially, the luminance components of the image data are classified into the range of predetermined luminance values to form a luminance histogram. A luminance value (luminance value in this case is assumed as $Y_0$) characterized in that a ratio of frequency of the histogram integrated from the dark component for all the samplings reaches a predetermined ratio is obtained. At this time, a parameter γ, by which the obtained luminance value $Y_0$ reaches a predetermined luminance value (luminance value in this case is assumed as $Y_1$, however, $Y_0 \leq Y_1$), is assumed as a parameter of representing the degree of improvement. Supposing that an operating result within [ ] described in a denominator in the equation (3) is nearly equal to Y(x, y), the parameter γ can be obtained by the following equation (4).

$$\gamma = 1 - \frac{\log Y_1}{\log Y_0} \quad (4)$$

In the present embodiment, although the parameter is to be automatically adjusted on the basis of the luminance component of the image data, the parameter may be automatically adjusted on the basis of pixel values of the R, G and B components of the image data. Further, an adjustment may be performed by a dialog method in such a manner that the parameter can be changed by an input interface and the luminance distribution is converted in accordance with a value of the changed parameter to reconstitute the image data and then the improved image data is to be displayed on a display.

In the above, a method of ideally improving the distribution of brightness in accordance with the image data to be processed on the basis of the prior art 1 has been explained. However, in the following, a method of ideally improving the distribution of brightness in accordance with the image data to be processed on the basis of the prior art 2 will be explained. Since difference from the above is mainly found in a process of improving the distribution of the luminance component of the image data to be executed in the step S105, a part corresponding to such the process will be mainly explained.

According to the prior art 2, a degree of generating a halo after the luminance conversion is evaluated by using the luminance components on different scales, and the optimum scale is determined such that the deterioration in image quality due to generation of the halo does not occur, then the luminance is to be converted. An example of applying the present invention to such the process will be indicated in the following equation (5).

$$Y'(x, y) = \frac{a \cdot Y(x, y)}{1 + e \cdot V(x, y)} \quad (5)$$

Here, the V(x, y) denotes a luminance component selected from the luminance components to which plural scale conversions were performed, symbol a denotes a parameter of adjusting intensity of the luminance component, and symbol e denotes a parameter of indicating the degree of improvement of the luminance component. It is needless to say that an adjustment method of an improvement parameter in the step S104 has to be changed in accordance with the change of an adjustment method in a luminance component improvement process.

In the above example explained based on the prior art 2, although the luminance component itself of an image is to be adjusted together with the degree of improvement of the luminance component, it is needless to say that the present invention may be combined with a process of adjusting the luminance component itself of the image.

In the process of the step S105, as a value within [ ] described in a denominator in the equation (3), a bilateral filtering process proposed by Durand et al. in "Fast Bilateral Filtering for the Display of High-Dynamic-Range Images", acm Transactions on Graphics, July 2002, Vol. 21, No. 3 may be applied to the luminance component. In this case, the bilateral filtering process is previously executed to the luminance component in the scale conversion process to be executed in the step S103.

Next, the improved luminance component is synthesized with the color components X(x, y) and Z(x, y) converted in the step S102 and reconstitutes the image data (step S106).

Figure 3:
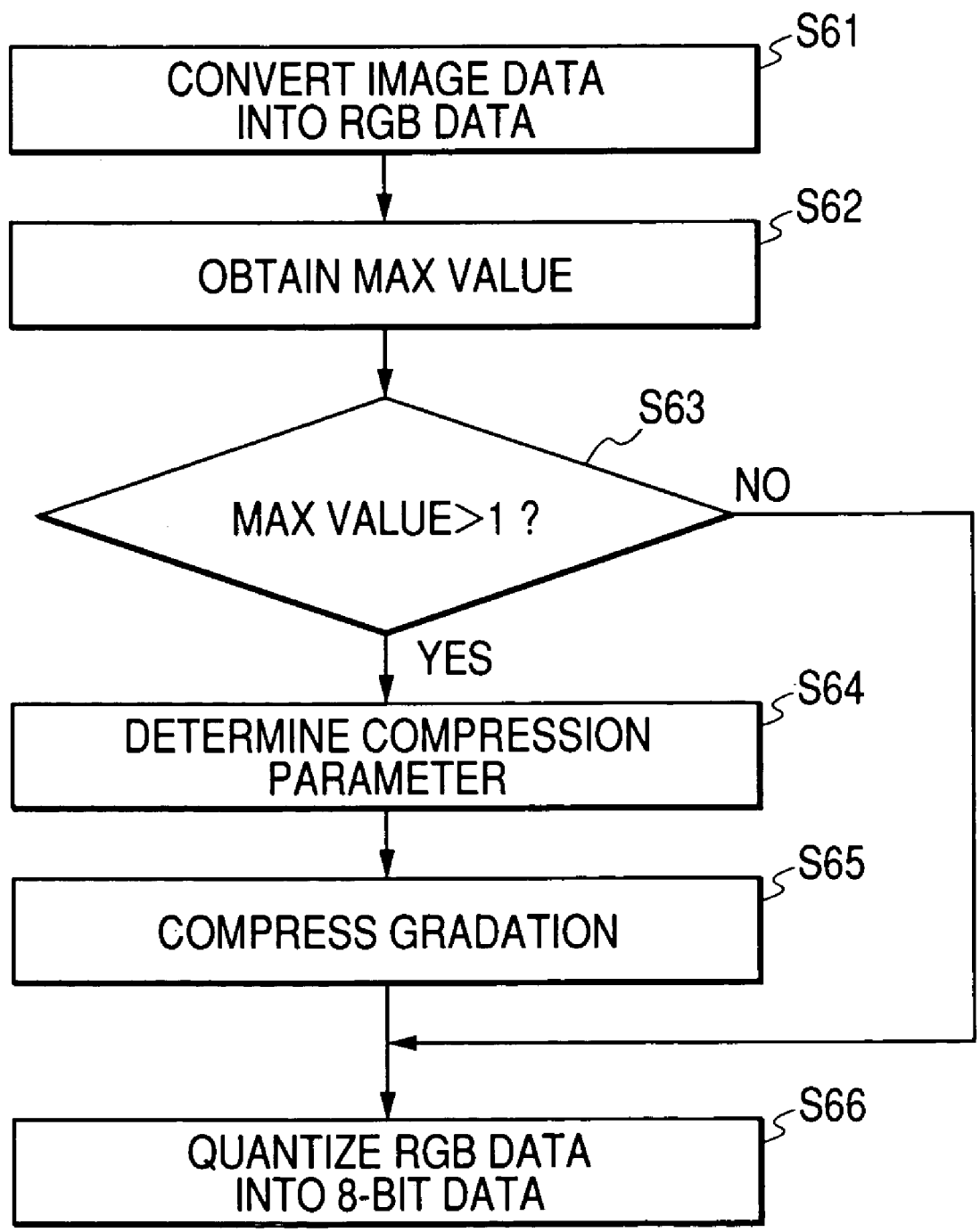
FIG. 3 is a view showing algorithm of the reconstitution of image data in the image processing system according to the first embodiment.

FIG. 3 shows detailed algorithm as to the reconstitution of the image data.

Initially, the image data is converted into RGB data (step S61).

Here, the color component is corrected in accordance with the change of the luminance component such that color of the reconstituted image data does not change as much as possible. For example, the color components X(x, y) and Z(x, y) are respectively multiplied by a ratio Y' (x, y)/Y(x, y) between before and after changing the luminance component. Then, the RGB data is obtained from data of X, Y and Z. A process executed in this case corresponds to an inverse conversion of the process executed in the step S102. Therefore, the 3×3 matrix operation and an inverse gamma conversion process are executed. In case of using another method such as conversion from the RGB data into the YCbCr data in the step S102 as a method of extracting the luminance component, it is needless to say that a process of the corresponded inverse conversion has to be executed in this process.

Next, a maximum value is obtained for the R, G and B image data (step S62).

Next, it is judged whether or not the obtained maximum value exceeds 1 (step S63).

When the obtained maximum value does not exceed 1, since the RGB data can be expressed by image data within an area of sRGB color space, the RGB data is quantized into eight-bit data for an output (step S66).

In this manner, in the step S66, when the luminance improved data exceeds a predetermined color gamut (range), gradation is compressed in accordance with a color gamut of the luminance improved data.

On the other hand, when the obtained maximum value exceeds 1, since the RGB data can not be expressed by the image data within the area of sRGB color space, if the RGB data is quantized into eight-bit data by a method of replacing a pixel value of exceeding 1 by a value of 1, gradation jump or color displacement occurs by the above quantization. Therefore, a parameter of gradation compression is determined (step S64) so as to perform the gradation compression to the RGB image data and then the gradation is compressed (step S65) on the basis of the parameter.

When a maximum value of the RGB data is assumed as p (p>1), the gradation is compressed such that the pixel value p becomes a maximum value 1 in the sRGB color space. For example, when the R, G and B data before compressing the gradation are respectively assumed as R1, G1 and B1 and when the R, G and B data after compressing the gradation are respectively assumed as R2, G2 and B2, the gradation is compressed for all the R, G and B data in an image by the following equations (6).

$$R2=k \cdot R1, \ G2=k \cdot G1, \ B2=k \cdot B1 \quad (6)$$

Here, symbol k denotes a parameter of the gradation compression, which satisfies an equation of k=1/p. However, when the value p is larger than a predetermined value (it is assumed that pm>1), since a degree of gradation compression becomes too large and the whole image becomes dark, the gradation is compressed by using an equation of k=1/pm in this case.

In the above example, although the gradation is compressed by primary conversion, the gradation may be compressed by secondary conversion. For example, when the maximum value of the RGB data is assumed as p (p>1), the gradation is compressed such that the pixel value p becomes the maximum value 1 in the sRGB color space. In a case where the pixel value is equal to 1, if a predetermined value is assumed to become an average value of 1 and 1/p, the gradation is compressed for all the RGB data in the image by the following equations (7).

$$R2=(k2 \cdot R1+k1)R1$$

$$G2=(k2 \cdot G1+k1)G1 \quad (7)$$

$$B2=(k2 \cdot B1+k1)B1$$

Here, symbols k2 and k1 denotes parameters of the gradation compression, which satisfy equations of k2=(p−1)/(2p·(P+1)) and k1=(P+1)/2p−k2. However, when the value p is larger than a predetermined value (it is assumed that pm>1), since the degree of gradation compression becomes too large and the whole image becomes dark, the gradation is compressed by using equations of k2=(pm−1)/(2pm·(pm+1)) and k1=(pm+1)/2pm−k2 in this case.

As another method, the gradation may be compressed by a method depending on a gamma conversion indicated by the following equation (8).

$$R2=(k3 \cdot R1)^\gamma$$
$$G2=(k3 \cdot G1)^\gamma \quad (8)$$
$$B2=(k3 \cdot B1)^\gamma$$

Here, symbols k3 and γ denote parameters of the gradation compression.

As above mentioned, when the maximum value of the RGB data exceeds 1, the gradation is compressed, and the RGB data is converted so as to be expressed by the image data within the area of sRGB color space and then the RGB data is quantized into eight-bit data for an output (step S66).

It should be noted that a suppression process of the gradation jump and the color displacement due to the gradation compression explained in the steps S62 to S66 can be applied to a luminance improvement process to be executed in the step S105. For example, when a range of the luminance distribution before converting the luminance is compared with a range of the luminance distribution after converting the luminance by the equation (3), the range of the luminance distribution before converting the luminance is included in a range from 0 to 1, while the range of the luminance distribution after converting the luminance has possibility of exceeding 1. In this case, a probability that the value of the RGB data exceeds 1 can be previously suppressed in the image data after performing the RGB conversion in the step S106 by compressing the luminance distribution to include it within a range of 0 to 1. For example, similar to the process in the step S105, a maximum value of the luminance distribution after executing the improvement process is obtained, and when the maximum value exceeds 1, a parameter is determined by a method which is similar form as indicated in the equations (6) to (8) and then the luminance is to be compressed.

If the suppression process of the gradation jump and the color displacement due to the gradation compression and the luminance compression explained in the above is executed, an image improved to become a light image by the improvement process becomes a dark image. In this case, brightness correction is performed to image data, to which the suppression process of the gradation jump and the color displacement due to the gradation compression and the luminance compression was executed, so as to maintain average brightness of an original image. For example, a luminance means value of the original image is assumed as $Y_{org}$, and when an output value in a case where the luminance is compressed for the original image of the luminance average value $Y_{org}$ by the method which is similar form as indicated in the equations (6) to (8) is assumed as $Y_{comp}$, a parameter γ0 which changes the value from the $Y_{comp}$ to the $Y_{org}$ can be obtained by the following equation (9).

$$\gamma 0 = \frac{\log Y_{org}}{\log Y_{comp}} \quad (9)$$

A gamma correction for outputting $R^{\gamma 0}$, $G^{\gamma 0}$ and $B^{\gamma 0}$ data to the RGB image data, to which the suppression process of the gradation jump and the color displacement due to the gradation compression and the luminance compression was executed, is performed in accordance with the obtained parameter γ0. However, if a value of the γ0 is too small, since an area of which brightness is beyond necessity appears, it is preferable that the value is limited to be included in a predetermined range.

The suppression process of the gradation jump and the color displacement due to the gradation compression and the luminance compression aims to suppress the gradation jump and the color displacement generated in case of executing the luminance improvement process to the image data. Therefore, it is judged whether or not the gradation jump or the color displacement is conspicuous when the image data after executing the luminance improvement process is included in a predetermined color space, and the suppression process of the gradation jump and the color displacement may be executed to an only image judged that the gradation jump or the color displacement is conspicuous in that image. For example, after executing the luminance improvement process, the changes in hue every pixel of the image data included in the predetermined color space and the original image data are calculated, and when a ratio of pixels, of which the change in hue exceeds a predetermined amount, for all the pixels exceeds a predetermined value, it is judged that the color displacement is conspicuous.

In the above, the present embodiment has been explained in a case of assuming the eight-bit R, G and B data as the image data to be processed. However, the present embodiment can be also applied to a case of reproducing the optimum eight-bit R, G and B image data from the 16-bit R, G and B image data.

Second Embodiment

Figure 4:
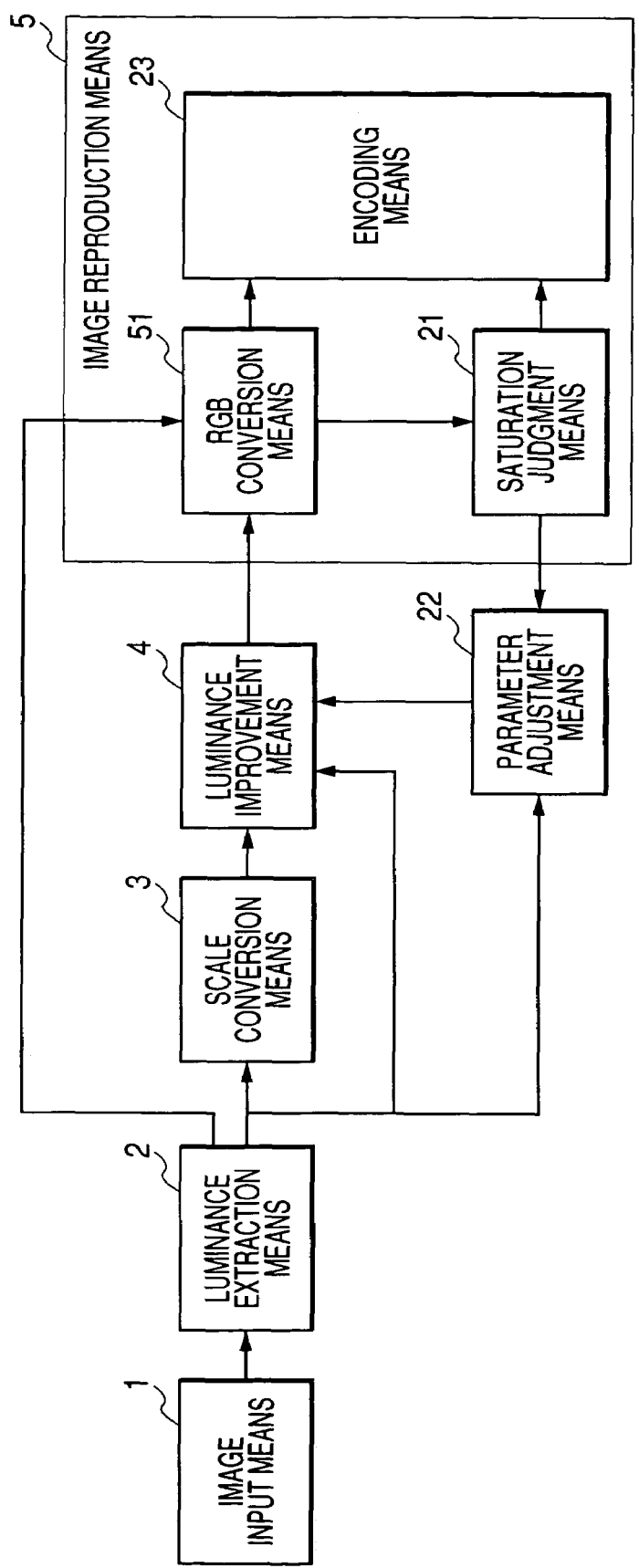
FIG. 4 is a view showing the structure of an image processing system according to the second embodiment.
Figure 5:
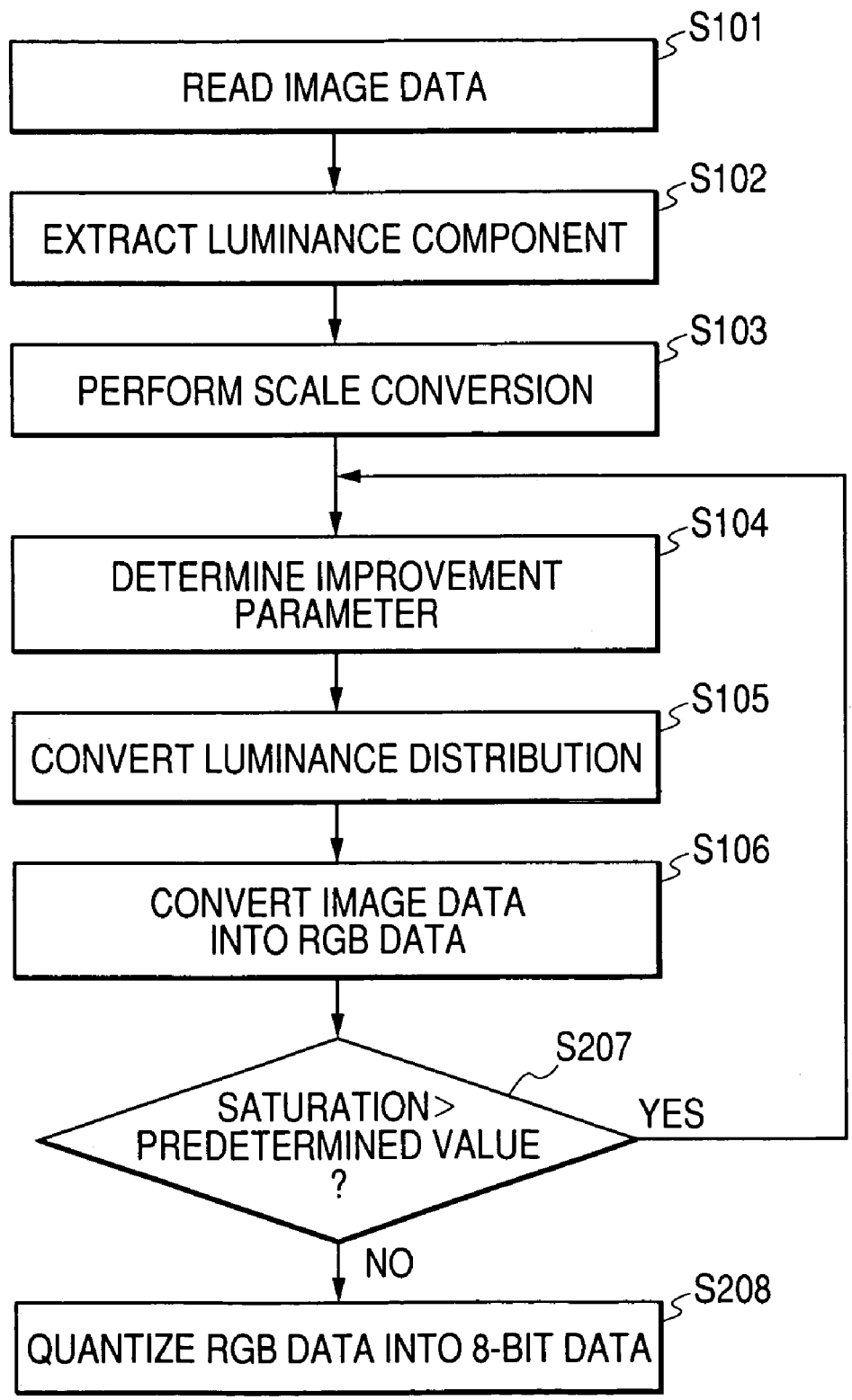
FIG. 5 is a view showing algorithm of an application program in the image processing system according to the second embodiment.

FIG. 4 shows the structure of an image processing system according to the second embodiment. The same structures as those in the first embodiment are respectively denoted by the corresponding reference numerals same as those in the first embodiment, and the description thereof will be omitted.

In the first embodiment, in the case where the luminance improved result exceeds the color gamut, the gradation is compressed for the luminance improved result. On one hand, in the present embodiment, a parameter used in improving the luminance is changed, and the luminance is improved again.

In FIG. 4, reference numeral 5 denotes an image reproduction means for reconstituting image data by synthesizing the improved luminance component which was output from a luminance improvement means 4 with the color component which was output from a luminance extraction means 2. The image reproduction means 5 is composed of an RGB conversion means 51, a saturation judgment means 21 and an encoding means 23. The RGB conversion means 51 synthesizes the improved luminance component with the color component and converts the synthesized data into the RGB image data. The saturation judgment means 21 judges a degree of color saturation of the converted RGB image data. The encoding means 23 encodes the RGB image data into image data of a predetermined format.

Reference numeral 22 denotes a parameter adjustment means for adjusting parameters so as to maintain a degree of improvement to be processed in the luminance improvement means 4 in the optimum condition in accordance with the image data from the luminance component of the image data which was output from the luminance extraction means 2 and the saturation of the image data of which the luminance was once improved.

Next, algorithm of the application program, by which an operation of the image processing system according to the present embodiment is performed on a general-purpose computer, will be explained.

In steps S101 to S106, a luminance improvement process is executed likewise the first embodiment (FIG. 2).

The saturation is judged for RGB image data which was obtained in the step S106 (step S207).

It is judged whether or not the saturation exceeds "1" (saturated) for the R, G and B components of the image data which was converted into the RGB data in the step S106, and the number of pixels (saturation) containing the components to be saturated is counted. Then, it is judged whether or not the number of pixels, of which data is saturated, exceeds a predetermined value. This process corresponds to a process of judging whether or not the image data is included in a predetermined range of color similar to a case in the first embodiment.

As a means of judging the saturation, the saturating amount is fixed as indicated by a left-hand side S in the following equation (10) and the fixed value may be compared with a predetermined value, other than the above method of simply counting the number of pixels of which data is saturated.

$$S=\Sigma\{ps(R-1)+ps(G-1)+ps(B-1)\} \quad (10)$$

Here, when x<0, ps(x)=0, and when x≧0, ps(x)=x. Further, symbols R, G and B denote the R, G and B image data of each pixel. Moreover, the above saturation may be regularized by the total number of pixels of an image.

In a case where the saturation exceeds a predetermined value in the step S207, it is judged that a degree of luminance improvement has to be weakened such that the saturation of the RGB data after improving the luminance is included in a predetermined range, then a process is shifted to a step S104 and an improvement parameter determined in the step S104 is weakened by a predetermined amount. For example, a parameter γ is obtained by using an average value of $(Y_0+Y_1)/2$ or the like instead of the luminance value $Y_1$ indicated in the equation (4).

On the other hand, in a case where the saturation does not exceed a predetermined value in the step S207, the RGB data converted in the step S106 is quantized into the eight-bit R, G and B data for an output (step S208). At this time, after a pixel value of exceeding 1 is replaced by a value of 1, the RGB data is quantized into the eight-bit R, G and B data.

In the present embodiment, although the saturation of color which is conspicuous was suppressed by reducing the degree of luminance improvement in the parameter adjustment means in a case where the saturation of the image data after executing the luminance improvement process exceeds the predetermined value, the luminance improvement process may not be applied in a case where the saturation exceeds a predetermined value upon again judging the saturation after the suppression.

In the above, although the present embodiment is explained in the case of assuming the eight-bit R, G and B data as the image data to be processed, the present embodiment can be also applied to a case of reproducing the optimum eight-bit R, G and B image data from the 16-bit R, G and B image data.

Third Embodiment

Figure 6:
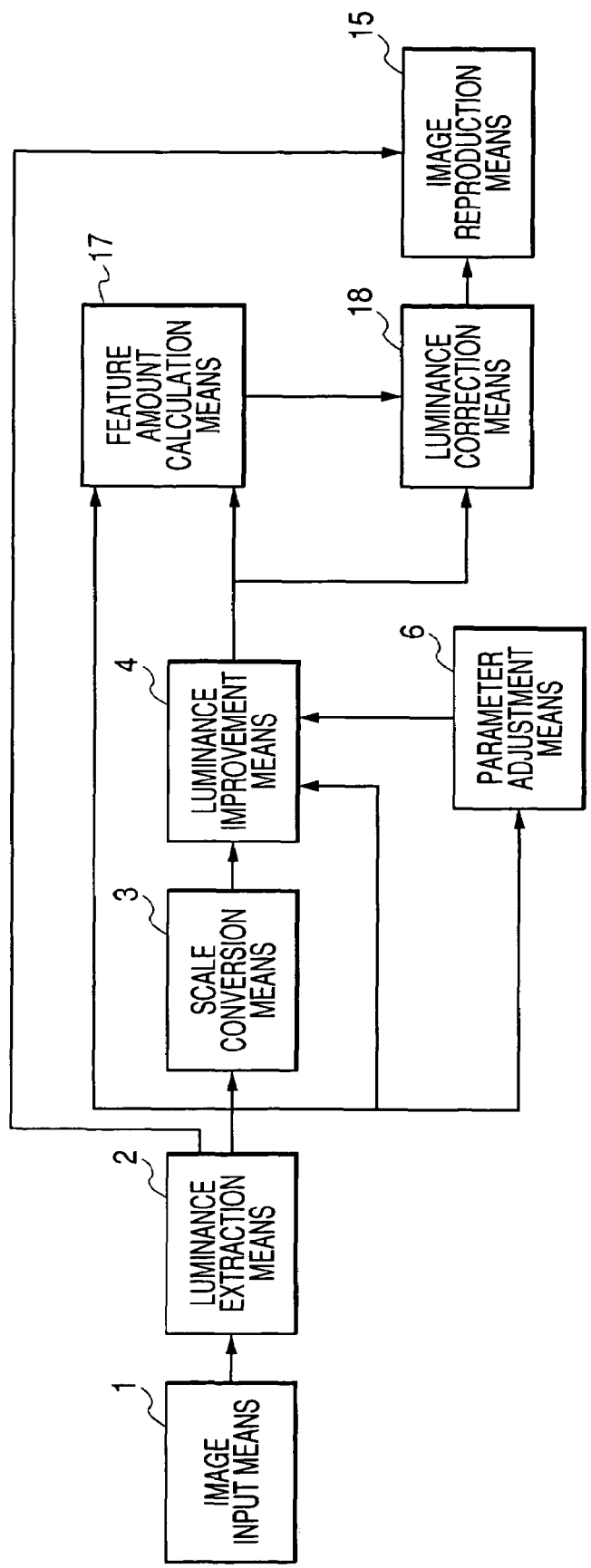
FIG. 6 is a view showing the structure of an image processing system according to the third embodiment.

FIG. 6 shows the structure of an image processing system according to the present embodiment.

In FIG. 6, reference numeral 1 denotes an image input means for inputting digital image data (hereinafter, called image data) into the image processing system. For example, such the input means is constituted in a digital camera, a scanner or the like.

Reference numeral 2 denotes a luminance extraction means for extracting luminance components and color components from the image data which was input by the image input means 1. Reference numeral 3 denotes a scale conversion means for obtaining the distribution, on a relative large scale, of the luminance component of the image data which was output from the luminance extraction means 2. Reference numeral 4 denotes a luminance improvement means for improving the distribution of the luminance component of the image data by using the luminance component of the image data which was output from the luminance extraction means 2 and the distribution, on the relative large scale, of the luminance component which was output from the scale conversion means 3. Reference numeral 6 denotes a parameter adjustment means for adjusting parameters so as to maintain a degree of improvement to be processed in the luminance improvement means 4 in the optimum condition in accordance with the image data from the luminance component of the image data which was output from the luminance extraction means 2.

Reference numeral 17 denotes a feature amount calculation means for extracting a feature amount by analyzing the luminance component of the image data which was output from the luminance extraction means 2 and the luminance component which was processed in the luminance improvement means 4. Reference numeral 18 denotes a luminance correction means for correcting a luminance distribution being an output from the luminance improvement means 4 so as to reduce the change between before and after the process by using the luminance feature amount extracted by the feature amount calculation means 17. Reference numeral 15 denotes an image reproduction means for reconstituting the image data by synthesizing the luminance component which was output from the luminance correction means 18 with the color component which was output from the luminance extraction means 2.

An operation of the above-structured image processing system can be also performed by an application program on a general-purpose computer. Hereinafter, the image processing system of which the operation is mainly performed in the application program will be explained.

Figure 7:
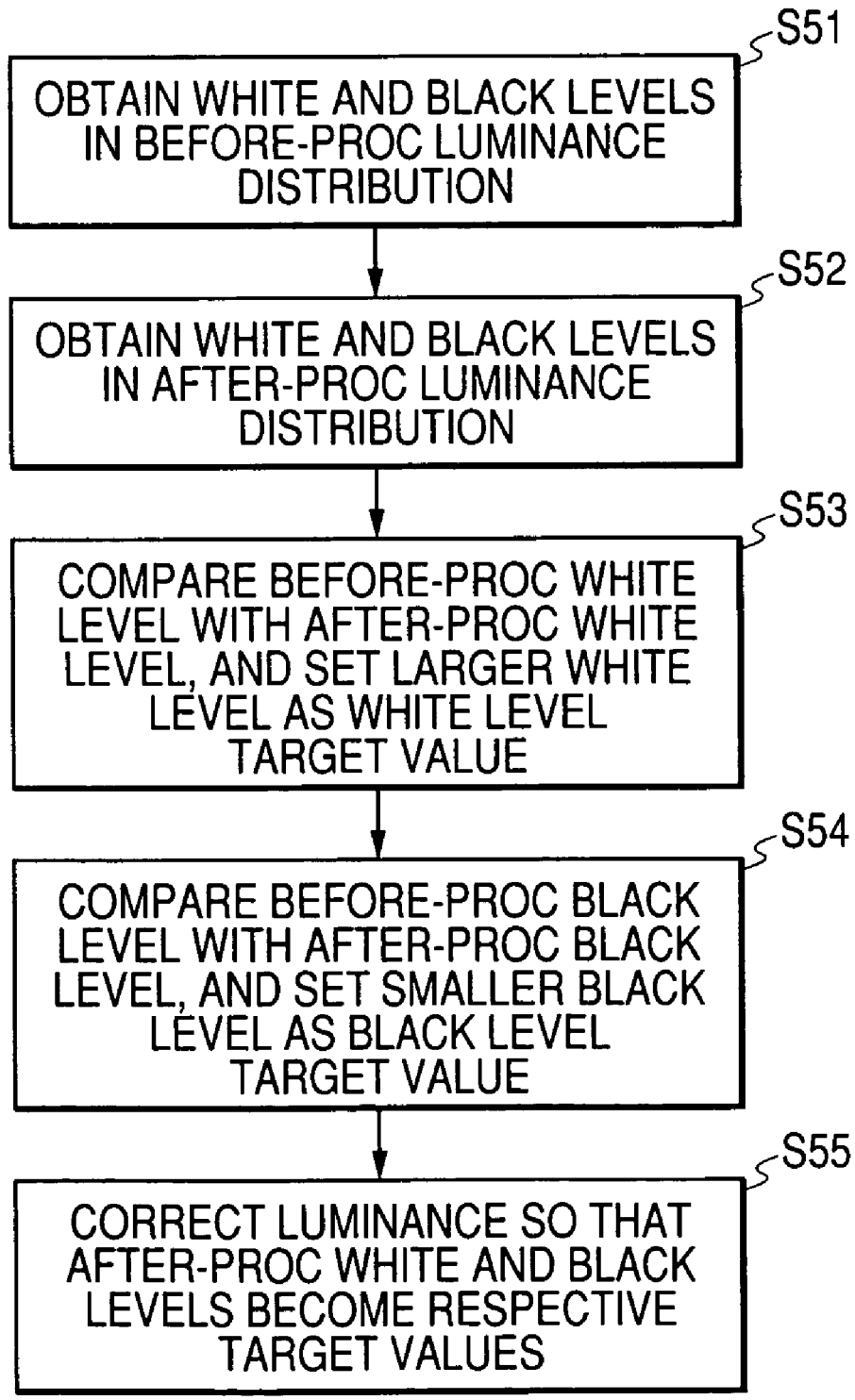
FIG. 7 is a view showing algorithm of the luminance correction according to the third embodiment.

FIG. 7 shows algorithm of the application program by which the operation of the image processing system in the present embodiment is performed on the general-purpose computer.

First, when the application program is activated, a user inputs a file name of the image data, and the image input means 1 reads the image data to store it in a storage unit in the computer (step S101).

The image data which was read corresponds to a two-dimensional arrangement of M×N pixels (here, symbol M denotes the number of horizontal pixels and symbol N denotes the number of vertical pixels) composed of, for example, eight-bit pixels, and the image data is composed of three planes of R, G and B components. The image data is assumed to be expressed by the R, G and B components as R(x, y), G(x, y) and B(x, y) (here, (x, y) are integers of representing a pixel position to be maintained within ranges of 1≦x≦M, 1≦y≦N). In a case where the image data is compressed by a method such as a JPEG method or the like, the image data is expanded in accordance with a predetermined expansion method so as to obtain image data composed of pixels of the R, G and B data.

Next, the luminance extraction means 2 extracts the luminance component on the basis of pixels of the R, G and B components composing the image data (step S102).

With respect to extraction of the luminance component, for example, it is assumed that the pixel components of R. G and B correspond to data in an sRGB color space described in the IEC 61966-2-1, and the data is converted into data of CIE 1931XYZ by a gamma conversion and a 3×3 matrix operation in accordance with a method described in the IEC 61966-2-1. Here, when the converted X, Y and Z data are assumed to be respectively represented as X(x, y), Y(x, y) and Z(x, y), data of Y(x, y) corresponds to the luminance component to be extracted.

As a method of extracting the luminance component, the above process is simplified, and the luminance component may be extracted by only the matrix operation. Further, conversion from the RGB data into the YCbCr data may be used. Still further, another conversion of using brightness components such as conversion from the RGB data into L*a*b* data or the RGB data into HSV data may be used.

Next, the scale conversion means 3 obtains the distribution of the luminance component on a relative large scale from the luminance component which was extracted in the step S102 (step S103). The luminance component on the large scale corresponds to a low frequency component of the luminance component.

In order to obtain the distribution of the luminance component on the large scale, for example, a convolution operation with the extracted luminance component and a Gaussian function is performed as in the prior art 1 to supply an output (however, in the prior art 1, the convolution operation is directly performed to pixels of RGB components of the image data but is not performed to the luminance component of the image data). In order to raise image quality of the improved image data, it is preferable that the convolution operation with the plural Gaussian functions different in the standard deviation is performed to obtain the distribution of the luminance component on plural scales (plural frequency components of the luminance component). It should be noted that the above process of obtaining the distribution of the luminance component on the large scale is called a scale conversion hereinafter.

Next, the parameter adjustment means 6 adjusts a parameter, which determines a degree of the luminance distribution to be improved, from the extracted luminance component (step S104). Since adjustment of the parameter associates with a process of improving the luminance distribution, the details thereof will be described later.

Next, the luminance improvement means 4 improves the distribution of the luminance component of the image data by using the luminance component of the image data extracted in the step S102 and the distribution of the luminance component to which the scale conversion was performed in the step S103 (step S105).

As an example of the process, according to a method based on the prior art 1, a logarithmic transformation is performed to the luminance component and the distribution of the luminance component to which the scale conversion was performed, and the obtained difference between them is output. Further, a weighted average of a difference output on different scales is assumed as the improved luminance component. However, since the degree of improvement cannot be adjusted in accordance with an image by this method, a logarithmic transformation output of the luminance component, to which the scale conversion was performed, is multiplied by a coefficient. This coefficient corresponds to a parameter of adjusting the degree of improvement. An output of the improved luminance component on the basis of the above process is indicated by the following equation (1).

$$Y'(x, y) = \sum_n w_n \{\log Y(x, y) - \gamma \cdot \log[F_n(x, y) * Y(x, y)]\} \quad (1)$$

Here, Y'(x, y), $F_n$(x, Y), $w_n$, n and γ respectively denote an output of the improved luminance component, a Gaussian function, weight between scales, a parameter for representing the scale and a parameter for representing the degree of improvement. Further, symbol "*" denotes the convolution operation.

It is understood that the weight between scales can be omitted by adjusting a standard deviation of the scale (replaced to a simple average) and it is preferable to return a luminance unit to an original luminance unit by an inverse transformation (exp. operation) rather than a value of logarithmic transformed is output as in the equation (1) as image quality of the improved image data. Therefore, it is preferable that an output indicated by the following equation (2) corresponds to the improved luminance component.

$$Y(x,y)=\exp<\log Y(x,y)-\gamma \cdot \text{Avg}\{\log[F_n(x,y)*Y(x,y)]\}> \quad (2)$$

Here, the Avg indicates an average value operation.

The following equation (3) may be available instead of the equation (2).

$$Y'(x, y) = \frac{Y(x, y)}{[\text{Avg}\{F_n(x, y) * Y(x, y)\}]^\gamma} \quad (3)$$

It should be noted that the average value operation of a scale conversion output on the plural scales is performed by the scale conversion process in the step S103, and an average value of the scale conversion output on the plural scales may be treated as the distribution of the luminance component to which the scale conversion was performed.

However, the luminance component, to which the improvement process was executed by the equation (3), changes in color of black level or white level in a low frequency area, and the contrast in the low frequency area of an image is deteriorated. As a result, clarity of an image is deteriorated. Therefore, the luminance component is corrected through processes to be executed by the feature amount calculation means 17 and the luminance correction means 18. The details thereof will be shown in FIG. 7.

First, the feature amount calculation means 17 estimates the white and black levels of the luminance distribution before executing the luminance improvement process being an output from the luminance extraction means 2 (step S51).

For example, the luminance components of the image data are classified into the range of predetermined luminance values to form a luminance histogram. A luminance value characterized in that a ratio of frequency of the histogram integrated from the light component for all the samplings reaches a predetermined ratio is estimated as the white level, and a luminance value characterized in that a ratio of frequency of the histogram integrated from the dark component for all the samplings reaches a predetermined ratio is estimated as the black level. For example, a luminance value characterized in that a ratio of frequency of the histogram integrated from the light component for all the samplings reaches a ratio of 0.5% is estimated as the white level, and a luminance value characterized in that a ratio of frequency of the histogram integrated from the dark component for all the samplings reaches a ratio of 0.5% is estimated as the black level. The white level and the black level estimated in the above processes are respectively assumed as $Y_W$ and $Y_B$.

Similarly, the feature amount calculation means 17 estimates the white level and the black level of the luminance distribution after executing the luminance improvement process being an output from the luminance improvement means 4 (step S52). The white level and the black level estimated in this step are respectively assumed as $Y'_W$ and $Y'_B$.

Next, the luminance correction means 18 compares the before-process white level with the after-process white level estimated in the feature amount calculation means 17, and the larger white level is set as a white level target value (step S53). This target value is assumed as $Y_{WT}$.

Similarly, the luminance correction means 18 compares the before-process black level with the after-process black level estimated in the feature amount calculation means 17, and the smaller black level is set as a black level target value (step S54). This target value is assumed as $Y_{BT}$.

Then, the luminance correction means 18 corrects the luminance such that the after-process white and black levels estimated in the feature amount calculation means 17 respectively become the white level target value obtained in the step S53 and the black level target value obtained in the step S54 (step S55).

For example, a correction by a partial linear conversion characterized in that a correction characteristic curve passes a point of the luminance improved black level, a point of the black level target value, a point of the luminance improved white level and a point of the white level target value is performed.

That is, when the luminance improved luminance level is lower than the black level estimated in the step S52, the luminance is corrected by the following equation (11).

$$Y''(x, y) = \frac{Y_{BT}}{Y'_B} Y'(x, y) \qquad (11)$$

Here, Y" (x, y) denotes an output of the corrected luminance component. When the luminance improved luminance level exists between the black level and the white level estimated in the step S52, the luminance is corrected by the following equation (12).

$$Y''(x, y) = \frac{Y_{WT} - Y_{BT}}{Y'_W - Y'_B} \{Y'(x, y) - Y'_B\} + Y_{BT} \qquad (12)$$

When the luminance improved luminance level is higher than the white level estimated in the step S52, the luminance is corrected by the following equation (13).

$$Y''(x, y) = \frac{1 - Y_{WT}}{1 - Y'_W} \{Y'(x, y) - 1\} + 1 \qquad (13)$$

When the luminance improved luminance level exceeds 1, the luminance level is previously converted into 1 before executing the correction process. As another method, the regularization by a linear compression or the like may be performed such that the maximum value of the luminance level becomes 1.

Incidentally, it should be noted that the above luminance correction conversion process is once formed as a luminance conversion table and the luminance correction process may be executed by referring the table. Further, the formed table is smoothed and the luminance correction process may be executed by referring the table using the smoothed table. In case of referring the table by using the smoothed table, it can be suppressed to generate pseudo gradation due to a process of referring the table.

In the above correction process, the before-process white and black levels are compared with the after-process white and black levels in the steps S53 and S54 then the white level target value and the black level target value are determined. However, the before-process white and black levels themselves may be treated as the white level target value and the black level target value. In this case, the change of luminance feature amount in before and after the improvement process is reduced by the luminance improvement means 4, and the luminance is corrected to become contrast of the luminance component before the improvement. In the present embodiment, a fact that the white level and the black level are respectively compared to set the white level target value and the black level target value aims a fact that the contrast after the luminance correction is corrected in high level by more increasing the white level and more decreasing the black level. That is, in the present embodiment, the before-process black level is compared with the after-process black level, and when the after-process black level is larger than the before-process black level, the luminance distribution is corrected so as to reduce the change of the luminance feature amount in before and after the process. Similarly, the before-process white level is compared with the after-process white level, and when the after-process white level is smaller than the before-process white level, the luminance distribution is corrected so as to reduce the change of the luminance feature amount in before and after the process.

In the present embodiment, a luminance histogram is formed, and the white level and the black level estimated from the formed luminance histogram are used as the feature amount of the luminance component of an image. However, for example, the feature amount such as an average value, a variance or the like of the luminance component which can represent the contrast of an image may be used.

Next, an example of a parameter adjustment method in the step S104 will be explained as to a case of converting the luminance by the equation (3) in the step S105.

Initially, similar to a case explained in the step S105, the luminance components of the image data are classified into the range of predetermined luminance values to form a luminance histogram. A luminance value (luminance value in this case is assumed as $Y_0$) characterized in that a ratio of frequency of the histogram integrated from the dark component for all the samplings reaches a predetermined ratio is obtained. At this time, a parameter γ, by which the obtained luminance value $Y_0$ reaches a predetermined luminance value (luminance value in this case is assumed as $Y_1$, however, $Y_0 \leq Y_1$), is assumed as a parameter of representing the degree of improvement. Supposing that an operating result within [ ] described in a denominator in the equation (3) is nearly equal to Y(x, y), the parameter γ can be obtained by the following equation (4).

$$\gamma = 1 - \frac{\log Y_1}{\log Y_0} \qquad (4)$$

In the present embodiment, although the parameter is to be automatically adjusted on the basis of the luminance component of the image data, the parameter may be automatically adjusted on the basis of pixel values of the R, G and B components of the image data. Further, an adjustment may be performed by a dialog method in such a manner that the parameter can be changed by an input interface and the luminance distribution is converted in accordance with a value of the changed parameter to reconstitute the image data and then the improved image data is to be displayed on a display.

Next, the image reproduction means 15 synthesizes the luminance component processed in the step S105 with the color components X(x, y) and Z(x, y) converted in the step S102 and reconstitutes the image data (step S106).

Here, initially, the color component is corrected in accordance with the change of the luminance component such that color of the reconstituted image data does not change as much as possible. For example, the color components X(x, y) and Z(x, y) are respectively multiplied by a ratio Y'(x, y)/Y(x, y) between before and after changing the luminance component. Then, the RGB data is obtained from data of X, Y and Z. A process executed in this case corresponds to an inverse conversion of the process executed in the step S102. Therefore, the 3×3 matrix operation and an inverse gamma conversion process are executed to output the 8-bit R, G and B data.

In case of using another method such as a conversion from the RGB data into the YCbCr data in the step S102 as a method of extracting the luminance component, it is needless to say that a process of the corresponded inverse conversion has to be executed in this process.

In the above, a method of ideally improving the distribution of brightness in accordance with the image data to be processed on the basis of the prior art 1 has been explained. However, it is needless to say that the present embodiment can be applied to the prior art 2 of using the luminance components of a digital image and the low frequency components thereof.

In the process of the step S105, as a value within [ ] described in a denominator in the equation (3), the bilateral filtering process proposed by Durand et al. in "Fast Bilateral Filtering for the Display of High-Dynamic-Range Images," acm Transactions on Graphics, July 2002, Vol. 21, No. 3 may be applied to the luminance component. In this case, the bilateral filtering process is previously executed to the luminance component in the scale conversion process to be executed in the step S103.

In the above example, although the present embodiment has been explained in a case of assuming the eight-bit R. G and B data as the image data to be processed, the present embodiment can be also applied to a case of reproducing the optimum eight-bit R, G and B image data from the 16-bit R, G and B image data.

As described above, the present invention has been explained on the basis of the preferable embodiments. However, the present invention is not limited to the above embodiments, but may be modified in various manners within the scope of the following claims.

What is claimed is:

1. An image processing method comprising:
    an extraction step of extracting a brightness component from image data;
    a scale conversion step of obtaining a distribution of the brightness component on a relatively large scale;
    an improvement step of improving the brightness component distribution of the image data by using the brightness component and an output in said scale conversion step; and
    a gradation compression step of determining whether or not the image data reconstituted according to the improved brightness component distribution is within a predetermined color gamut, and, when it is determined that the reconstituted image data includes the image data outside the predetermined color gamut, of performing a gradation compression process.

2. An image processing method according to claim 1, wherein said gradation compression step adjusts a degree of gradation compression according to the color gamut of a target image.

3. An image processing method according to claim 1, wherein said gradation compression step adjusts a degree of gradation compression based on a maximum value of the image data of a target image.

4. An image processing method according to claim 1, wherein said gradation compression step adjusts a degree of gradation compression with use of a degree equal to or lower than a predetermined amount.

5. An image processing method according to claim 1, wherein said improvement step determines whether or not the brightness component distribution to be improved is within a predetermined range, and, when it is determined that the brightness component distribution includes the brightness component outside the predetermined range, compresses the brightness component.

6. An image processing method according to claim 1, wherein the image data subjected to the gradation compression process is further subjected to brightness correction.

7. A computer program stored on a computer-readable medium for causing a computer to perform an image processing method comprising:
    an extraction step of extracting a brightness component from image data;
    a scale conversion step of obtaining a distribution of the brightness component on a relatively large scale;
    an improvement step of improving the brightness component distribution of the image data by using the brightness component and an output in said scale conversion step; and
    a gradation compression step of determining whether or not the image data reconstituted according to the improved brightness component distribution is within a predetermined color gamut, and, when it is determined that the reconstituted image data includes the image data outside the predetermined color gamut, of performing a gradation compression process.

8. An image processing method comprising:
    an extraction step of extracting a brightness component from image data;
    a scale conversion step of obtaining a distribution of the brightness component on a relatively large scale;
    an improvement step of improving a brightness distribution of the image data by using the brightness component and an output in said scale conversion step;
    a determining step of determining a degree of saturation of the image data whose brightness distribution is improved in said improvement step; and
    an adjustment step of adjusting a degree of the improvement in said improvement step, according to the degree of the saturation determined in said judgment step.

9. A computer program stored on a computer-readable medium for causing a computer to perform an image processing method comprising:
    an extraction step of extracting a brightness component from image data;
    a scale conversion step of obtaining a distribution of the brightness component on a relatively large scale;

an improvement step of improving a brightness distribution of the image data by using the brightness component and an output in said scale conversion step;

a determination step of determining a degree of saturation of the image data whose brightness distribution is improved in said improvement step; and an adjustment step of adjusting the degree of the improvement in said improvement step, according to the degree of the saturation judged in said determination step.

10. An image processing method comprising:

an extraction step of extracting a brightness component from image data;

a low-frequency component calculation step of obtaining a low-frequency component of the brightness component;

a correction step of correcting the brightness component by using the low-frequency component of the brightness component calculated in said low-frequency component calculation step; and an adjustment step of adjusting the brightness component corrected in said correction step, by using an adjustment condition obtained from a feature amount of the brightness component in an image before execution of said correction step and a feature amount of the brightness component in the image after execution of said correction step.

11. An image processing method according to claim 10, wherein said low-frequency component calculation step obtains the low-frequency components of plural different bands, and said correction step corrects the brightness component by using the low-frequency components of the plural different bands.

12. An image processing method according to claim 10, wherein the feature amount of the brightness component includes brightness component values in a black level and a white level in the image.

13. An image processing method according to claim 10, wherein, in said correction step, a parameter which is obtained from a feature amount obtained from a histogram of the brightness component of the image and a preset luminance value is used.

14. A computer program stored on a computer-readable medium for causing a computer to achieve an image processing method comprising:

an extraction step of extracting a brightness component from image data;

a low-frequency component calculation step of obtaining a low-frequency component of the brightness component;

a correction step of correcting the brightness component by using the low-frequency component of the brightness component calculated in said low-frequency component calculation step; and an adjustment step of adjusting the brightness component corrected in said correction step, by using an adjustment condition obtained from a feature amount of the brightness component in an image before execution of said correction step and a feature amount of the brightness component in the image after execution of said correction step.

15. An image processing apparatus comprising:

an extraction unit adapted to extract a brightness component from image data;

a scale conversion unit adapted to obtain a distribution of the brightness component on a relatively large scale;

an improvement unit adapted to improve the brightness component distribution of the image data by using the brightness component and an output from said scale conversion unit; and a gradation compression unit adapted to determine whether or not the image data reconstituted according to the improved brightness component distribution is within a predetermined color gamut, and, when it is determined that the reconstituted image data includes the image data outside the predetermined color gamut, to perform a gradation compression process.

16. An image processing apparatus comprising:

an extraction unit adapted to extract a brightness component from image data;

a low-frequency component calculation unit adapted to obtain a low-frequency component of the brightness component;

a correction unit adapted to correct the brightness component by using the low-frequency component of the brightness component calculated by said low-frequency component calculation unit; and an adjustment unit adapted to adjust the brightness component corrected by said correction unit, by using an adjustment condition obtained from a feature amount of the brightness component in an image before the correction by said correction unit and a feature amount of the brightness component in the image after the correction by said correction unit.

17. An image processing method comprising:

an extraction means for extracting a brightness component from image data;

a scale conversion means for obtaining a distribution of the brightness component on a relatively large scale;

an improvement means for improving a brightness distribution of the image data by using the brightness component and an output in said scale conversion means;

a determining means for determining a degree of saturation of the image data whose brightness distribution is improved in said improvement means; and an adjustment means for adjusting a degree of the improvement in said improvement means, according to the degree of the saturation determined in said judgment means.

18. A computer program stored on a computer-readable medium for causing a computer to perform an image processing method comprising:

an extraction step of extracting a brightness component from image data;

a low-frequency component calculation step of obtaining a low-frequency component of the brightness component;

a correction step of correcting the brightness component by using the low-frequency component of the brightness component calculated in said low-frequency component calculation step; and an adjustment step of adjusting the brightness component corrected in said correction step, by using an adjustment condition obtained from a feature amount of the brightness component in an image before execution of said correction step and a feature amount of the brightness component in the image after execution of said correction step.

* * * * *

UNITED STATES PATENT AND TRADEMARK OFFICE
CERTIFICATE OF CORRECTION

| | | |
|---|---|---|
| PATENT NO. | : 7,409,083 B2 | |
| APPLICATION NO. | : 10/890148 | |
| DATED | : August 5, 2008 | |
| INVENTOR(S) | : Yano | |

It is certified that error appears in the above-identified patent and that said Letters Patent is hereby corrected as shown below:

ON THE TITLE PAGE
At Item (56) References Cited, OTHER PUBLICATIONS:
"Durand et al., "Fast Bilateral Filtering for the Display of High-Dynamic-Range Images," ACM Transactions on Graphics, vol. 21, No. 3 (Jul. 2002)." (second occurrence) should be deleted.

ON THE TITLE PAGE
At Item (57) Abstract:
Line 1, "It" should read --The present invention--.

COLUMN 1:
Line 11, "image" should read --an image--.
Line 18, "a aperture" should read --an aperture--.
Line 32, "in case" should read --in the case--.
Line 41, "bright excessively" should read --excessively bright.--.
Line 48, "so-called" should read --a so-called--.
Line 67, "acm" should read --ACM--.

COLUMN 2:
Line 65, "object" should read --objects--.

COLUMN 3:
Line 36, "such the" should read --such--.
Line 42, "relative" should read --relatively--.
Line 49, "relative" should read --relatively--.
Line 67, "in case" should read --in a case--.

COLUMN 4:
Line 20, "algorithm" should read --an algorithm--.
Line 34, "integers of" should read --integers--.
Line 66, "relative" should read --relatively--.

COLUMN 5:
Line 15, "In case" should read --In the case--.

COLUMN 6:
Line 2, "transformed" should read --transformation--.
Line 23, "In case" should read --In the case--.

UNITED STATES PATENT AND TRADEMARK OFFICE
CERTIFICATE OF CORRECTION

| | |
|---|---|
| PATENT NO. | : 7,409,083 B2 |
| APPLICATION NO. | : 10/890148 |
| DATED | : August 5, 2008 |
| INVENTOR(S) | : Yano |

It is certified that error appears in the above-identified patent and that said Letters Patent is hereby corrected as shown below:

COLUMN 7:
Line 5, "such the" should read --such--.
Line 13, "such the" should read --such--.
Line 40, "acm" should read --ACM--.
Line 49, "detailed" should read --a detailed--.
Line 63, "In case" should read --In the case--.

COLUMN 8:
Line 60, "denotes" should read --denote--.

COLUMN 9:
Line 12, "above mentioned," should read --mentioned above,--.
Line 37, "similar form" should read --similar in form--.
Line 52, "similar form" should read --similar in form--.

COLUMN 10:
Line 7, "in case" should read --in the case--.
Line 14, "an only image" should read --only an image--.
Line 17, "every" should read --for every--.
Line 64, "algorithm" should read --an algorithm--.

COLUMN 11:
Line 2, "likewise" should read --similarly to--.
Line 66, "such the" should read --such--.

COLUMN 12:
Line 5, "relative" should read --relatively--.
Line 12, "relative" should read --relatively--.
Line 42, "algorithm" should read --an algorithm--.
Line 58, "integers of" should read --integers--.

COLUMN 13:
Line 19, "relative" should read --relatively--.

COLUMN 14:
Line 17, "transformed" should read --transformation--.

UNITED STATES PATENT AND TRADEMARK OFFICE
CERTIFICATE OF CORRECTION

PATENT NO. : 7,409,083 B2
APPLICATION NO. : 10/890148
DATED : August 5, 2008
INVENTOR(S) : Yano It is certified that error appears in the above-identified patent and that said Letters Patent is hereby corrected as shown below:

COLUMN 16:
Line 1, "referring" should read --referring to--.
Line 3, "referring" should read --referring to--.
Line 4, "referring" should read --referring to--.
Line 6, "referring" should read --referring to--.
Line 9, "S54 then" should read --S54, then--.
Line 14, "amount in" should read --amount--.
Line 16, "contrast" should read --a contrast--.
Line 20, "aims a fact that" should read --is used to correct --.
Line 21, "is corrected in high level" should be deleted; and "more" should be deleted.
Line 22, "increasing" should read --increasing more--; and "more decreasing" should read --decreasing more--.

COLUMN 17:
Line 23, "In case" should read --In the case--.
Line 32, "of using" should read --by using--.
Line 39, "acm" should read --ACM--.

Signed and Sealed this

Tenth Day of February, 2009

JOHN DOLL
*Acting Director of the United States Patent and Trademark Office*